United States Patent [19]

Bachot et al.

[11] Patent Number: 4,547,411

[45] Date of Patent: Oct. 15, 1985

[54] PROCESS FOR PREPARING ION-EXCHANGE MEMBRANES

[75] Inventors: Jean Bachot, Fontenay aux Roses; Jean-Pierre Quentin, Lyons; Jean-Luc Bourgeois, Tassin la Demi Lune, all of France

[73] Assignee: Chloe Chimie, Paris, France

[21] Appl. No.: 538,473

[22] Filed: Oct. 3, 1983

Related U.S. Application Data

[60] Continuation of Ser. No. 339,669, Jan. 15, 1982, abandoned, which is a continuation of Ser. No. 130,090, Mar. 13, 1980, abandoned, which is a division of Ser. No. 19,822, Mar. 12, 1979, abandoned.

[30] Foreign Application Priority Data

Mar. 14, 1978 [FR] France ................................ 78 08066
Dec. 13, 1978 [FR] France ................................ 78 35034

[51] Int. Cl.$^4$ ........................ B05D 3/02; B05D 7/02
[52] U.S. Cl. ................................ 427/393.5; 204/296; 427/393.6; 427/430.1
[58] Field of Search ............ 204/296; 427/244, 430.1, 427/393.5, 393.6, 336

[56] References Cited

U.S. PATENT DOCUMENTS

| | | | |
|---|---|---|---|
| 3,694,281 | 9/1972 | Leduc | 204/296 X |
| 3,980,613 | 9/1976 | Bachot et al. | 264/45.3 |
| 4,031,041 | 6/1977 | Bouy et al. | 264/45.3 X |
| 4,056,655 | 11/1977 | Faille et al. | 427/393.6 |
| 4,101,395 | 7/1978 | Montani et al. | 204/296 |
| 4,178,218 | 12/1979 | Seko | 204/98 |

FOREIGN PATENT DOCUMENTS

| | | | |
|---|---|---|---|
| 700296 | 12/1964 | Canada | 204/296 |
| 860405 | 2/1961 | United Kingdom | 204/296 |

*Primary Examiner*—Evan K. Lawrence

[57] ABSTRACT

A process for preparing membranes for electrolysis. One such process comprises impregnating a porous sheet comprising a polyfluoroolefin, asbestos fibers and an inorganic pore-forming agent with a solution comprising (i) a compound selected from the group consisting of acrylic acid and methacrylic and (ii) at least one other non-ionic monomer having at least one $>C=CH_2$ group, withdrawing said sheet from contact with said solution, polymerizing the monomers which become impregnated in the sheet so that the pores of the sheet contain the resulting acrylic polymer, eliminating the inorganic pore-forming agent to form pores in the sheet, and swelling the acrylic polymer so that the pores of the sheet are closed by the polymer. The membranes produced by these processes are useful in cells for the electrolysis of sodium chloride to produce chlorine and sodium hydroxide.

2 Claims, No Drawings

PROCESS FOR PREPARING ION-EXCHANGE MEMBRANES

This is a continuation of application Ser. No. 339,669 filed Jan. 15, 1982 entitled MEMBRANES, abandoned, which is a continuation of application Ser. No. 130,090, filed Mar. 13, 1980, abandoned, which in turn is a division of application Ser. No. 19,822, filed Mar. 12, 1979, abandoned.

BACKGROUND OF THE INVENTION

The present invention relates to a method of preparing membranes having ion-exhange properties for use in electrolyisis and electrolytic cells.

Many types of ionic or non-ionic membranes have been proposed for many years as separator diaphragms in electrolysis, electrodialysis, and other applications using electric cells with electrodes.

Among the various applications contemplated, one of them is of great importance, namely, the electrolysis of aqueous saline solutions, particularly solutions of sodium chloride (NaCl) for the production of chlorine and caustic soda. The importance of these processes comes from the fact that industry requires a large amount of chlorine and caustic soda so that the NaCl electrolysis units are necessarily large. Furthermore, in view of the quantities manufactured, the slightest gains in chemical, electrical, or energy yield are highly desirable. However, the production and improvement of NaCl electrolysis membranes present very difficult problems, since the simultaneous presence of chlorine and high concentrations of caustic soda in the hot electrolyte constitute corrosion conditions which few membranes are capable of withstanding.

In addition to the corrosion-resistance properties just mentioned, it is advantageous to use cation-selective membranes, i.e., cation exchangers, since they make it possible to obtain caustic soda which is less contaminated with chloride and, potentially, better electrical yields.

When the membranes used are ion-selective, it is, in general, more difficult to obtain the ability that they withstand corrosion, than when non-ionic membranes are employed.

It is accordingly an object of the present invention to provide a method of preparing electrolytic cell membranes having ion exhange properties. One such method comprises impregnating a porous sheet comprising a polyfluoroolefin, asbestos fibers and an inorganic pore-forming agent with a solution comprising (i) a compound selected from the group consisting of acrylic acid and methacrylic acid and (ii) at least one other non-ionic monomer having at least one $>C=CH_2$ group, withdrawing said sheet from contact with said solution, polymerizing the monomers which become impregnated in said sheet so that the pores of the sheet contain the resulting acrylic polymer, eliminating said inorganic pore-forming agent to form pores in said sheet, and swelling the acrylic polymer so that the pores of the sheet are closed by the polymer.

Other objects of the invention will be apparent to those skilled in the art from the present description.

GENERAL DESCRIPTION OF THE INVENTION

The present invention provides a process of preparing membranes having performance properties in electrolysis. These membranes are formed of a sheet of polyfluoroolefin and asbestos fibers, which is impregnated with a copolymer of acrylic acid and/or methacrylic acid, with at least one other non-ionic monomer, which has a $>C=CH_2$ group. The sheet of polyfluoroolefin and asbestos fibers may be microporous, with the pores of this sheet being closed by a copolymer, as defined above.

A polyfluoroolefin is a polymer, which may include homopolymers and copolymers of tetrafluoroethylene and perfluoropropylene, which can also be an ethylene tetrafluoroethylene copolymer. Polytetrafluoroethylene is preferably employed.

The asbestos fibers generally have lengths of between about 0.5 mm. and 5 cm., and preferably between about 1 mm. and 3 cm. As asbestos fibers suitable for use, mention may be made of fibers of the crocidolite, anthoplyllite, amosite, tremolite, or actinolite type. However, fibers of the chrysotile type are preferred.

The relative weight ratio of polyfluoroolefin with respect to the asbestos fibers is generally between about 0.1 and 5 and, preferably, between about 0.2 and 3.5.

The weight ratio (expressed in percentage) of the combination (polyfluoroolefin+asbestos) referred to the entire membrane is between about 20 and 60 percent, and, preferably, between about 25 and 40 percent.

The non-ionic monomers, having a $>C=CH_2$ group, which are copolymerized with the acrylic acid or methacrylic acid, are generally mono-unsaturated or oligo-unsaturated. As monomeric compounds which can more particularly be used mention may be made, among the ethylenically mono-unsaturated hydrocarbons, of styrene, o-, m-, and p-methylstyrenes or ethylstyrenes; o- and p-fluorostyrenes; α-methylstyrene; among the ethylenically oligo-unsaturated hydrocarbons, mention may be made of para-divinylbenzene and of 1,3,4-trivinyl cyclohexane.

One can, and this is preferred, use both an ethylenically mono-unsaturated non-ionic monomer and an ethylenically oligo-unsaturated non-ionic monomer, the numerical proportion of these two types of monomers being then between about 0.1 and 10, and, preferably, between about 0.4 and 2.5.

The relative weight ratio of polymerized acrylic or methacrylic acids, with respect to the total of the acrylic (or methacrylic) and non-ionic (unsaturated hydrocarbon) (polymerized) monomers, is generally between about 10 and 80 percent and, preferably, between about 30 and 70 percent.

Obviously, upon the use, or prior to this use, of the membranes in accordance with the invention, the carboxyl groups coming from the acrylic monomers can be salinified, in particular, by replacement of the hydrogen atom by alkali ions. It is to be understood throughout the present invention that the acid groups of the polymeric membrane components may, therefore, be salinified.

The pores which are closed by the acrylic copolymer have a diameter which is generally between about $0.5\mu$ and $20\mu$, and, preferably, between about $0.1\mu$ and $12\mu$. The mean diameter (or diameter of the pores corresponding to a maximum of the number of pores having this diameter) is generally between about $0.2\mu$ and $6\mu$.

The preparation of the membranes in accordance with the invention can, according to a first embodiment of the process, be effected generally by copolymerization of acrylic or methacrylic acid with the non-ionic monomer directly in the pores of a microporous sheet or diaphragm having a base of polyfluoroolefin and asbestos. In order to do this, a microporous diaphragm having a base of polyfluoroolefin and asbestos is first produced. Such diaphragms are known, in particular, from French Pat. Nos. 2,229,739 and 2,280,609 and their United States counterparts, namely, U.S. Pat. Nos. 3,980,613 and 4,031,041, respectively, the substance of which is incorporated herein by reference. There may be concerned either a diaphragm by itself or a diaphragm placed on an electrode, the electrode, for instance, being of gridded structure and of the shape of the glove-finger type.

The pore-producing agents which can be employed in the invention are agents of inorganic type which can be eliminated by any means known, per se. One can thus use water-soluble, inorganic salts which are eliminated subsequently by leaching. Salts which can be decomposed, for instance, chemically, may also be used, such as the carbonates. It is preferred to use salts which can be eliminated by decomposition, rather than by leaching, since their elimination can be controlled better. As pore-producing agents, mention may be made of the alkali or alkali-earth salts, in particular, the halides, sulfates, sulfites, bisulfites, phosphates, carbonates, and bicarbonates. The quantity and particle size of these pore-producing agents are selected in such a manner that, by elimination of the pore-producing agent, the sheet of polyfluoroolefin and asbestos fibers remain flexible and manipulatable and has a porosity corresponding to the values indicated above.

In order to carry out the process of the invention one, therefore, must start by producing (or obtaining) a sheet comprising at least one polyfluoroolefin, asbestos fibers, and optionally an inorganic pore-producing agent. There may be employed either individual sheets or sheets deposited on a support, such as an electrode, this electrode being, for instance, of gridded structure and of the glove-finger shape. The sheet itself may be made in any known manner, for instance by mixing the dry components together and then pressing or sintering. The sheet can also be produced by filtration, followed by the drying of a suspension comprising at least one polyfluoroolefin, asbestos fibers, and optionally an inorganic pore-producing agent. The drying can also be followed by a pressing or sintering of the sheet.

This diaphragm-forming sheet is then immersed into an impregnation bath formed of a liquid or solution containing acrylic acid and/or methacrylic acid and one or more non-ionic monomers as described. This immersion is continued so as thoroughly to impregnate the diaphragm with the bath, but it is to be understood that the characteristics of the microporous diaphragm, the nature and the proportions of the other monomers, and the time of immersion are selected in accordance with what has been defined above for the membranes in accordance with the invention.

The impregnation of the film by the impregnation bath may be a true immersion, the film being immersed in the bath and the two faces of the film being in contact with the impregnation bath, but it is also possible to treat only one face of the film with the impregnation bath; the impregnation then takes place also throughout the entire thickness of the membrane, but this impregnation treatment on a single face makes it possible more easily to avoid the inclusion of air in the membrane.

When the film or microporous diaphragm has been impregnated with the bath which has been defined above, it is removed therefrom and the acrylic acid or methacrylic acid and non-ionic monomers are then polymerized by any means known, per se. In accordance with a preferred embodiment, the impregnation solution for the microporous diaphragm contains a polymerization initiator, preferably a free-radical generator, such as a peroxide (for instance, benzoyl, lauroyl, tertiobutyl or cumyl peroxide) or azobis-isobutyronitrile. Under heat and known conditions, these initiators cause the unsaturated monomers to copolymerize, which leads to production of a membrane in accordance with the invention.

As solvents for the acrylic and non-ionic monomers, it is preferred to use a solvent which also exerts a swelling action with respect to a copolymer of arcylic acid or methacrylic acid and ionic monomer. As suitable solvents, mention may be made of dioxzne, dimethylformamide, dimethylacetamide, dimethylsulfoxide, and methylene chloride. When the monomers are liquid and miscible with each other, it may be unnecessary to use a solvent.

The amount of initiator is generally between about 0.1 and 20 percent by weight, referred to the weight of acrylic acid or methacrylic acid.

The concentration of the monomer in the impregnating solution is generally greater than about 50 percent, and, preferably, greater than about 70 percent.

The polymerization temperature is selected as a function of the decomposition temperature of the initiator. This temperature is obtained by heating the diaphragm impregnated with acrylic monomer. The heating can be effected by immersion in a hot liquid. The use of saline solutions makes it possible better to limit any possible elimination of the acrylic monomer in the heating bath.

The polymerization is advantageously continued until it is highly advanced and, preferably, complete transformation of the monomers into polymers.

The cycle of the impregnation and polymerization operations may be repeated several times.

As the case may be, before impregnation by the monomers or after polymerization, the pore-forming agent is, when applicable, eliminated. The method of eliminating this pore-producing agent depends on its nature. The principal methods of elimination are, as already stated, leaching-out and decomposition, in particular, chemical decomposition, this latter method being preferred. The treatment is carried out preferably by contacting the previously obtained sheet with a bath for the elimination of the pore-forming agent. This bath is preferably an aqueous bath. The contacting of the membrane wih the elimination bath may either be a true immersion or a contacting with a single face of the membrane. However, in one manner or the other, the nature of the elimination bath and the time of the elimination treatment are selected so as to eliminate at least about 95 percent (by weight), and, preferably, 100 percent, of the pore-producing agent.

In general, it is preferred to use mild conditions of elimination of the pore-forming agent, that is to say, conditions in which the pore-forming agent is slowly eliminated so as not to risk harming the membrane. A period of elimination of more than 5 hours is preferred. When there is involved an elimination of salts which are decomposable in acid medium, it is preferred to use an aqueous solution of a weak acid as the decomposition bath. As example of weak acids, mention may be made of the carboxylic acids, such as acetic acid, and, more particularly, the water-soluble alkanoic acids.

After completion of the various operations which have been described above, the membranes obtained are generally washed with water and/or treated by immersion in aqueous baths the nature of which approximates, to a greater or lesser extent, the conditions of use.

The membranes prepared in accordance with the process of the invention may have the most varied shapes, the most common shapes being flat, cylindrical or "glove-finger" (a cylinder closed at one of its ends). They can be used in particular in the electrolysis of sodium chloride for the manufacture of chlorine and caustic soda.

A variant embodiment of the process of the present invention employs a sheet of low porosity comprising a polyfluoroolefin and asbestos fibers which is impregnated with a solution comprising acrylic acid and/or methacrylic acid and at least one other non-ionic monomer provided with at least one $>C=CH_2$ group, whereupon this sheet is withdrawn from its contact with this impregnation bath and the monomers impregnated in said sheet are polymerized. In this variant, the initial sheet which comprises the polyfluoroolefin and the asbestos fibers, has a certain reduced microporosity or cavities of different shape, without it having been necessary to use or incorporate a pore-forming agent.

In accordance with another embodiment of the process of the invention, a sheet comprisinsg a polyfluoroolefin, asbestos fibers, and a mineral pore-forming agent is impregnated with a solution comprising acrylic acid and/or methacrylic acid and a least one other non-ionic monomer provided with at least one $>C=CH_2$ group, whereupon this sheet is withdrawn from contact with this impregnation solution, the monomers impregnated in the sheet are polymerized, and the inorganic mineral pore-forming agent is then eliminated.

It has been found that, as in the first embodiment of the process of the invention, there are obtained, by these variants of the process of the invention, membranes formed of a sheet whose pores are filled with the ionic resin or clogged by it. Such a structure can be obtained by the process of the invention on the one hand because the starting sheet, with or without pore-forming agent, is already somewhat microporous and, on the other hand, because, even when pores are formed by the elimination of the pore-forming agent after polymerization of the acrylic resin, the latter is capable of filling these pores by swelling. One advantage of the process of the invention is that it makes it possible to reduce the internal stresses in the membranes due to this swelling, these internal stresses being capable of producing splitting.

The starting sheet, having a base of polyfluoroolefin and asbestos fibers and possily an inorganic pore-forming agent, generally has a certain microporosity, even without having undergone a special treatment intended to produce pores. It is believed that this microporosity is increased by the heterogeneity of the components of the starting sheet. It may happen that even apparently dense films, such as those which have been subjected to rolling, nevertheless have a certain microporosity.

These interpretations of the phenomena which occur upon the impregnation of the sheet of fluorinated resin and asbestos by the comonomers, upon their polymerization or after same, are given to facilitate an understanding of the invention but do not limit its scope.

The membranes, in accordance with the invention, may have the most varied shapes, the most common shapes being the flat, cylindrical, or "glove-finger" (a cylinder closed at one of its ends) shapes.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

In the examples which follow, the membranes have been characterized by the following properties:

Permeability to OH⁻ ions

This is measured in the following manner:

In a cell having two compartments separated by the membrane to be examined and one containing 5N (normal) aqueous sodium hydroxide solution and the other a 5N aqueous NaCl solution, the increase with time of the concentration of OH⁻ ions in the NaCl compartment is observed; one obtains therefrom the permeability:

$$P_{OH^-} = \frac{V(C_{t+\Delta t} - C_t)}{S \cdot 2{,}3_{\Delta \overline{C} \Delta t}}$$

in which $$\overline{\Delta C} = \frac{\Delta C_t - \Delta C_{t+\Delta t}}{\log_{10} \Delta C - \log_{10} \Delta C_{t+\Delta t}}$$

$\Delta C_t$ is the difference in concentration of OH⁻ ions between the two compartments at the time t;

$\Delta t$ is the time interval in question;

V is the volume of each compartment;

S is the membrane surface.

This determination can be carried out at different temperatures (25° or 80° C.).

Electrical substitution resistance (Rs)

For a given membrane surface, Rs is the variation in electrical resistance of a vein of liquid when the membrane is subjected to a layer of liquid of the same thickness and of the same surface as the membrane, in a position perpendicular to the axis of the vein.

In the present case, this substitution resistance is measured in an aqueous 10N NaOH solution. It is expressed in Ohm.cm.². The membrane is treated in this same medium for 24 hours before the measurement.

EXAMPLES 1 to 8

A. Preparation of the porous diaphragm 40 parts of asbestos (in the form of fibers of chrysotile type of a length of between 0.5 and 5 mm. and a mean diameter of $0.018\mu$) and of calcium carbonate of a particle size of between 15 and $20\mu$ (1000 parts of $CaCo_3$ in the α variant; only 500 parts in the β variant) are mixed, with agitation (at 1800 rpm), for 10 minutes. The temperature is maintained at 60° C. by cooling with water. 166.6 parts of an emulsion of polytetrafluoroethylene (60 percent dry extract) and 130 g. of sodium nonyl-dodecylsulfonate (solution of 62 g./l.) are added, the mixture is agitated for 5 minutes (45 rpm) and then formed into sheets (of a thickness of 1 mm. in the case of the α-1 and β-1 variants and of 2mm. for the β-2 variant), by five successive passes between rolls held at 50° C., the gap between which is progressively decreased from 3 to 0.2 mm. The drying is effected at 90° C. for 15 hours and the sintering at 350° C. for 12 minutes. The diaphragms are then cut to a size of 20×20 cm. and immersed in a solution of acetic acid (concentration: 20 percent by weight) at 25° C. for 72 hours at atmospheric pressure and then for 24 hours under 100 mm. of mercury pressure (the vacuum is "broken" every hour and immediately reestablished). The acetic acid solution is renewed when the pH reaches 4.5. After washing with water, the diaphragms are stored in water at room temperature.

The diaphragms prepared in accordance with variant α have a mean pore size ranging from 2.5 to 5μ, the pores being distributed between 0.07μ and 12μ (measurements effected by mercury porosimeter).

The diaphragms prepared in accordance with variant β-1 have a mean pore size equal to 4μ, these pores being distributed between 0.07μ and 12μ. In the case of variant β-2, the mean size ranges from 0.6μ to 4μ and the pores are distributed between 0.07μ and 12μ.

B. Incorporation of the ionic resin

The diaphragm prepared under "A", above, is dried at 60° C., at 100 mm. of mercury for 15 hours (size 10×10 cm.) and then immersed in 50 cc. of the mixture of monomers and initiator and solvent for 30 minutes under reduced pressure (100 mm. of mercury). The vacuum is broken every 5 minutes. The membrane is removed from the bath, placed between two sheets of filter paper for superficial drying, and then heated for 1 hour at 90° C. by immersion in a saturated solution of sodium sulfate.

It is then placed in a stream of water at 25° C. for 5 minutes and then in water of 100° C. for 30 minutes.

Before the meausrements (permeability and substitution resistance) the membrane is treated at 90° C. for 100 hours in an aqueous solution containing:

200 g./l. NaOH
5 g./l. NaClO₃
1 g./l. NaClO

The following table indicates, for each example, the operating conditions and the results obtained.

end of the electrolysis. These membranes were well able to withstand these operating conditions.

EXAMPLE 9

(Membrane deposited on gridded cathode)

A. Prepartion of the microporous diaphragms

A₁ - Preparation of the suspension

A suspension of asbestos fibers is prepared containing: 100 g. of asbestos fibers, one-third being long (1 to 3 cm.) and two-thirds being short (0.2 to 1 cm.), 3390 g. of water, and 1.5 g. of sodium dioctylsulfosuccinate in 75 percent solution by weight in ethyl alcohol.

Agitation is effected for 45 minutes with an agitator rotating at 1370 rpm.

There are then added: 100 g. of polytetrafluoroethylene in the form of a 60 percent latex (aqueous suspension) by weight of dry extract, and 560 g. of calcium carbonate of a particle size of between 1μ and 10μ (average 5μ).

Agitation is effected for 45 minutes, whereupon it is set aside for 24 hours and then agitated for an additional 45 minutes as previously.

A₂ - Deposit on gridded cathode

A steel cathode of glove-finger shape is used having a height of 7 cm. and a section of 7 cm.×2.2 cm. This cathode is formed of a grid of 4 mm. thickness consisting of wires of 2 to 3 mm. in diameter; these wires being woven and rolled so as to leave mesh openings of 2.1 mm. This glove-finger is immersed in the previously prepared solution without the suspension, however, entering into the inside of the glove-finger. Suction is then applied from the inside of the glove-finger, allowing the absolute pressure to drop gradually in 6 minutes from 660 mm. of Hg. to 160 mm. of Hg. The cathode is then withdrawn from the bath and the application of the vacuum (160 mm. of Hg. ) is continued for 20 minutes. The suction being then stopped, heat treatment is effected for 24 hours at 150° C. (drying) and then 10 minutes at 300° C. and 6 minutes at 360° C. (sintering).

A₃ - Final preparation of the microporous diaphragm

The previously prepared cathode assembly is im-

| EXAMPLE | DIAPHRAGM IN ACCORDANCE WITH VARIANT | IMPREGNATION LIQUID FOR THE POROUS DIAPHRAGM The ionic monomer used is methacrylic acid. The quantities of the various other components are indicated in weight percentage referred to the weight of said methacrylic acid. | | | | PERMEABILITY TO HYDROXYL IONS (to be multiplied by $10^{-4}$ in order to obtain cm./min.) | | SUBSTITUTION RESISTANCE in ohm. cm.$^2$ | |
|---|---|---|---|---|---|---|---|---|---|
| | | SOLVENT | | | | | | | |
| | | dioxane | ethyl-benzene | divinyl-benzene | benzoyl peroxide | at 25° C. | at 80° C. | at 25° C. | at 80° C. |
| 1 | α-1 | 0 | 20 | 20 | 4 | 2.5 | | 38 | 5.5 |
| 2 | α-1 | 0 | 20 | 20 | 2 | 3 | | 5.5 | 1.1 |
| 3 | α-1 | 0 | 30 | 30 | 4 | 1.5 | | 13.5 | 4.5 |
| 4 | β-1 | 14 | 20 | 20 | 2 | 4.5 | | 6.5 | 1.1 |
| 5 | β-1 | 0 | 40 | 40 | 4 | 0.7 | 3.1 | 31 | 4.4 |
| 6 | β-1 | 0 | 40 | 40 | 2 | 0.5 | 1.6 | 31.5 | 7.1 |
| 7 | β-1 | 0 | 30 | 30 | 4 | 1.3 | | 13 | 3.1 |
| 8 | β-2 | 0 | 40 | 40 | 4 | | 0.1 | 40 | 13 |

Additionally, the membranes of Examples 1 and 8, above, were used in an NaCl electrolysis cell for 1000 hours. The electrolysis conditions were as follows: current density: 25 amps/dm.$^2$; temperature: 81° C.; concentration of NaCl: 3.8 mols/l.; concentration of sodium hydroxide: initially 3 mols/l. and 10 mols/l. at the mersed for four days in an aqueous solution of 20 percent by weight acetic acid and 0.2 percent phenylthiourea (anticorrosvie agent), which solution eliminates the calcium carbonate from the diaphragm.

After washing with water and drying in air at 30° C. for 48 hours, there is obtained a glove-finger cathode covered with a microporous layer of a thickness of 2.5 mm. formed of a mixture of asbestos fibers and polytetrafluoroethylene.

B. Impregnation by the methacrylic acid/divinyl-benzene mixture

The previously prepared cathode/diaphragm assembly is immersed for 1 hour in 0.6 liter of a mixture of: 10 parts of methacrylic acid, 6 parts of divinyl-benzene, and 0.4 part of benzoyl peroxide.

The cathode/diaphragm assembly is emptied of the mixture which has entered into it. Polymerization is then effected in the following manner: the assembly is immersed (except for the inside) for 1 hour in an aqueous $Na_2SO_4$ solution saturated at 90° C. It is washed with water and then treated for 30 minutes at 100° C. in water.

C. Use in electrolysis

The membrane deposited on the grid cathode is treated in 5N sodium hydroxide solution, whereupon the assembly is placed between two flat anodes of 0.5 dm.$^2$ surface each. These anodes consist of expanded titanium (plate of 1 mm. thickness expanded so as to create diamond-shaped meshes of 16 mm. $\times$ 7 mm.) covered with a mixture of platinum and iridium. the cathode-anode spacing is 5 mm.

The anode compartment is fed with saturated brine (aqueous solution of NaCl) and the cathode compartment with pure water.

Electrolysis is effected at 85° C. with a current density of 25 amps/cm.$^2$.

When equilibrium is reached, the potential difference between the cathode and an anode is about 4.1 volts, the concentration of sodium hydroxide in the cathode compartment is 360 g./l., the concentration of sodium chloride in the anode compartment is 260 g./l., the concentration of chloride ions in the cathode compartment is about 400 ppm (parts per million) referred to the sodium hydroxide.

The electric efficiency in sodium hydroxide is 50 percent (this efficiency is also known as the current efficiency; an efficiency of 100 percent is efficiency such that one Faraday produces 1 mol of caustic soda).

EXAMPLE 10

A sheet of asbestos and polytetrafluoroethylene is prepared as in Examples 1 and 8, above, up to the cutting of a sample. In the present example, this sheet is then cut to a size of 15$\times$15 cm.

Preparation of the membrane

In order to be able to treat this film by the impregnation bath only or a single face thereof, this film is previously fixed against a polyester film, a silicone joint assuring tightness between the two films at their periphery. The assembly is immersed for 30 minutes in 300 cc. of a methacrylic acid/ethyl benzene/divinyl-benzene/benzoyl peroxide mixture of weight proportions of 100/20/20/6, respectively.

The impregnated film is then removed from the impregnation bath. It is detached from its polyester support. The content of monomers introduced into the membrane is 17 percent by weight.

This impregnated film is then immersed for 1 hour in a saturated aqueous solution of sodium sulfate of temperature of 90° C., and then held for 30 minutes in boiling water. It is finally dried for 15 hours in air at 90° C.

This series of operations is then carried out a second time, namely, fixing on a polyester support—immersion in a monomer bath—polymerization of the monomers by immersion in hot aqueous media.

The film treated in this manner is immersed for 5 days in a aqueous solution of acetic acid of 25 percent by weight, providing new solution each day. On the fifth day, the immersion treatment is carried out under an absolute pressure reduced to 100 mm. of Hg., it being returned to atmospheric pressure once per hour.

The ion-exchange membrane thus obtained is treated before use for 100 hours in an aqueous solution containing 200 g./l. of caustic soda (NaOH), 5 g./l. of $NaClO_3$ and 1 g./l. of NaClO.

This membrane has a substitution resistance of 2.7 ohm.cm.$^2$ and a permeability to hydroxyl ions of $4.5 \cdot 10^{-4}$ cm./min.

EXAMPLES 11 to 13

A suspension of fibers is prepared from 100 g. of asbestos (one-third fibers having a length of between 1 and 3 cm.; two-thirds fibers having a length of between 0.2 and 1 cm.), 3330 g. of water, and 1.5 g. of sodium dioctylsulfosuccinate in 75 percent by weight solution in alcohol.

Agitation is effected for homogenization, whereupon there are added 30 g. of polytetrafluoroethylene in the form of an emulsion of 60 percent dry extract. The agitation is continued so as to obtain an intimate mixture.

This emulsion is filtered through a square asbestos cloth of a side of 14 cm. until 23 g. of the dry material have been retained on this filter cloth. The filtered material is kept with its filter. The assembly is dried for 24 hours at 150° C. and then for 10 minutes at 300° C. and then 10 minutes at 350° C.

The final thickness of the microporous film is 2 mm.

Preparation of the membrane

The previously prepared film is immersed in a methacrylic acid/divinyl benzene/benzoyl peroxide mixture for 30 minutes at room temperature under vacuum (absolute pressure reduced to 100 mm. of Hg.; the vacuum is removed every 5 minutes and then restored immediately.

The difference between these three examples, i.e., Examples 11, 12 and 13, results from the respective proportions of methacrylic acid, divinyl benzene, and benzoyl peroxide. These respective weight proportions are 100/40/4 in Example 11; 100/40/6 in Example 12; and 100/60/6 in Example 13.

The impregnated film is removed from its impregnation bath, wiped dry, and then immersed for 90 minutes in an aqueous solution of NaCl saturated at 90° C. Finally, it is immersed for 30 minutes in boiling water.

The membranes are then treated with an NaOH/NaClO$_3$/NaClO mixture, as in Example 1, above, whereupon they are used in an electrolysis operation at 80° C. at 25 amps/dm.$^2$ (electric current density). The anolyte is an aqueous solution of NaCl (3.7 M) and NaOH (9 N), these concentrations being maintained constant throughout the electrolysis by suitable additions.

The catholyte is initially an aqueous NaOH solution of 3 mols/l.; when the concentration reaches 9 mols/l., it is kept at this value by a suitable addition of water and removal. The membrane of Example 13 operated for 2000 hours without any substantial change in its performance. There are set forth below the results observed at equilibrium, that is to say, when the NaOH concentration of the catholyte has reached a value of 9N.

| EXAMPLE | VOLTAGE IN VOLTS BETWEEN ELECTRODES | CONCENTRATION OF CHLORIDE IONS IN THE CATHOLYTE EXPRESSED IN mg./l. | ELECTRIC EFFICIENCY IN % |
|---|---|---|---|
| 11 | 4.1 | 20 | 64 |
| 12 | 3.95 | 20 | 60 |
| 13 | 4.9 | 10 | 71 |

In Example 13, the electric efficiency was 80 percent when the NaOH concentration in the catholyte was 3N.

The terms and expressions which have been employed are used as terms of description and not of limitation, and there is no intention in the use of such terms and expressions of excluding any equivalents shown and described or portions thereof, but it is recognized that various modifications are possible within the scope of the invention claimed.

What is calimed is:

1. A process for preparing ion-exchange membranes suitable for use in electrolysis, which process comprises impregnating a porous sheet comprising a polyfluoroolefin, asbestos fibers and an inorganic pore-forming agent, with a solution comprising (i) a compound selected from the group consisting of acrylic acid and methacrylic acid and (ii) at least one other non-ionic monomer having at least one $>C\!=\!CH_2$ group, withdrawing said sheet from contact with said solution, polymerizing the monomers which become impregnated in said sheet so that the pores of the sheet contain the resulting acrylic polymer, eliminating said inorganic pore-forming agent to form pores in said sheet and swelling the acrylic polymer so that the pores of the sheet are closed by the polymer.

2. A process according to claim 1, wherein the polyfluroolefin is a homo-polymer or copolymer of tetrafluoroethylene or perfluoropropylene and the said non-ionic monomer is a member selected from the group consisting of styrene, o-, m- and p-methyl styrene, o-, m- and p-ethyl styrene, o- and p-fluorostyrene, $\alpha$-methystyrene, and p-divinyl benzene benzene.

* * * * *

UNITED STATES PATENT AND TRADEMARK OFFICE
CERTIFICATE OF CORRECTION

PATENT NO. : 4,547,411

DATED : October 15, 1985

INVENTOR(S) : Bachot et al.

It is certified that error appears in the above-identified patent and that said Letters Patent is hereby corrected as shown below:

Col. 4, Line 13, "arcylic" should be --acrylic--

Col. 4, Line 15, "dioxzne" should be --dioxane--

Col. 5, Line 25, "comprisisng" should be --comprising--

Col. 5, Line 29, "a least" should be --at least--

Col. 5, Line 52, "possily" should be --possibly--

Col. 8, Line 64, "anticorrosvie" should be --anticorrosive--

Col. 11, Line 21, "calimed" should be --claimed--

Col. 12, Line 26, delete "benzene" second occurrence

Signed and Sealed this

Eighth Day of September, 1987

*Attest:*

DONALD J. QUIGG

*Attesting Officer*  *Commissioner of Patents and Trademarks*